United States Patent [19]

Perepolkin

[11] 4,204,485
[45] May 27, 1980

[54] FUEL VAPORIZING DEVICES FOR INTERNAL COMBUSTION ENGINES

[76] Inventor: John Perepolkin, Box 3126, Castlegar, British Columbia, Canada, V1N 3H4

[21] Appl. No.: 706,955

[22] Filed: Jul. 20, 1976

[51] Int. Cl.² .................. F02B 43/00; F02B 43/08
[52] U.S. Cl. .......................... 123/34 A; 123/25 B; 123/25 D; 123/25 F
[58] Field of Search .............. 123/25 B, 25 D, 25 F, 123/133, 34 A

[56] References Cited

U.S. PATENT DOCUMENTS

| | | | |
|---|---|---|---|
| 3,965,871 | 6/1976 | Morton | 123/25 B |
| 3,968,775 | 7/1976 | Harpman | 123/25 B |
| 4,020,811 | 5/1977 | La Force | 123/133 |
| 4,023,538 | 5/1977 | Harpman | 123/25 B |
| 4,050,419 | 9/1977 | Harpman | 123/25 B |

*Primary Examiner*—Stephen C. Bentley
*Assistant Examiner*—Thomas H. Webb

*Attorney, Agent, or Firm*—R. William Wray & Associates

[57] ABSTRACT

In the art of motor fuel carburetion where conventional carburetors are employed to mix and prepare the fuel-/air mixture for introduction into the combustion chamber of internal combustion engines, and particularly where gasoline is used as fuel, the liquid fuel is sucked, or aspirated out of the provided discharge opening by the current of intake air as it flows past this opening, thereby presumably mixing and preparing the fuel/air charge.

In this invention the method of mixing liquid fuel with air employs a liquid fuel delivery spray valve which is so located as to spray liquid fuel upon an electrically heated metal plate which instantly converts the fuel from its liquid state into vapor form; a water delivery spray valve which is so located in similar fashion as the fuel delivery valve described above, to moderate the explosive violence of high octane fuel in the combustion chamber of internal combustion engines; and an electrically heated porous screen to atomize the fuel/air/-steam mixture charge.

9 Claims, 1 Drawing Figure

U.S. Patent
May 27, 1980
4,204,485
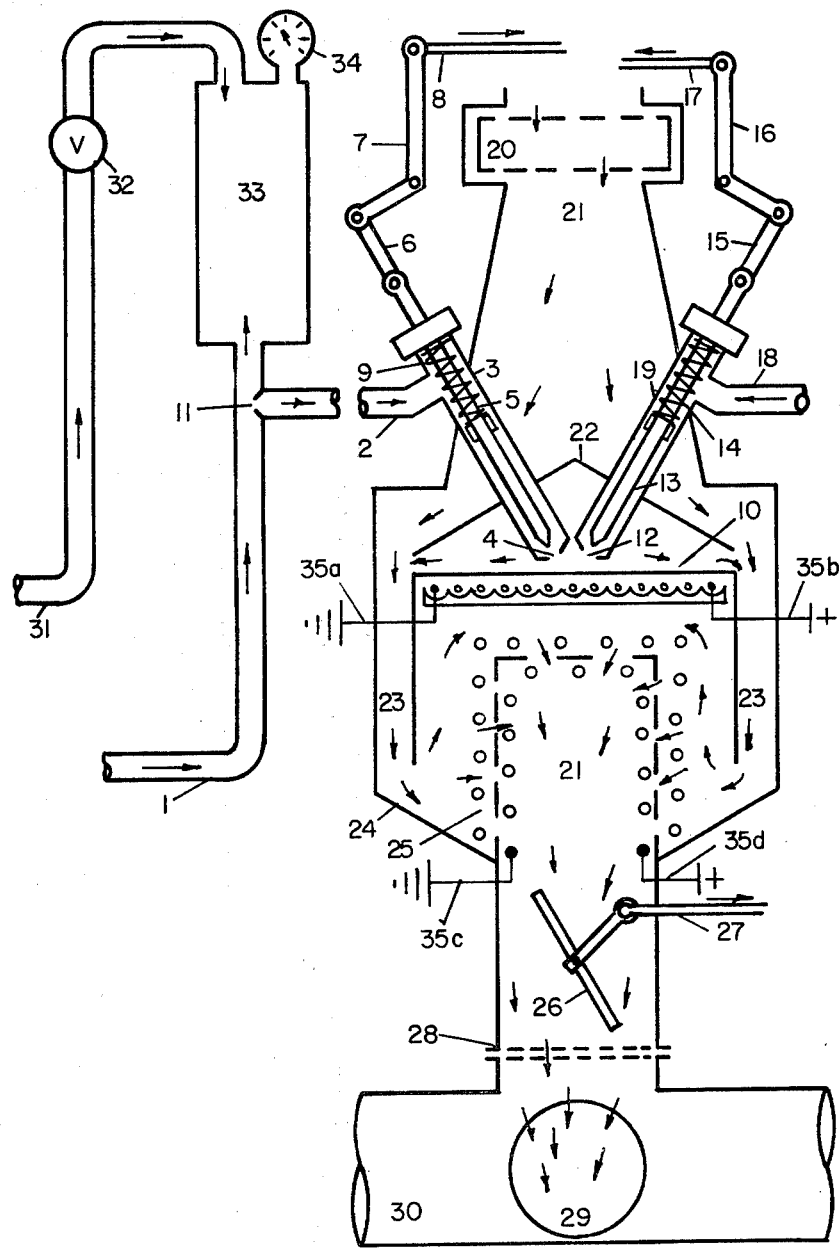

FUEL VAPORIZING DEVICES FOR INTERNAL COMBUSTION ENGINES

This invention relates to fuel vaporizing devices in the art of motor fuel carburetion, the process of which prepares a continuous charge of fuel vapor/air/steam mixture for introduction into the combustion chamber of internal combustion engines and, particularly those using gasoline as fuel.

Heretofore the common practise in the design and construction of conventional carburetors has been to provide a liquid fuel discharge opening at one end of a liquid conducting passage, the other end of which, being the inlet opening, is connected to a reservoir of liquid fuel.

It is assumed that in such provision of the liquid fuel discharge opening, the mixing of liquid fuel and air takes place when the current or flow of intake air rushes past said opening and aspirating the liquid fuel therefrom by the velocity of the intake air current flowing by to the combustion chamber.

It must also be assumed that the above conventional method of carburetion is directly related to the thoroughness of the liquid fuel/air mixing, which is one of the deciding factors which pronounces the degree of efficiency of such carburetion in terms of energy extracted from a given quantity of fuel consumed.

It can be readily appreciated by those experienced in the art that carburetting liquid fuel by the process of aspiration alone lacks the ability to expose the maximum number of burnable hydrocarbons in the fuel to the prevalent supply of oxygen in the flow of intake air for intimate intermixing. The above fact is further accentuated by the high pollution factor where the conventional mode of liquid fuel carburetion is employed, because of incompletely burned fuel, the residue of which is emitted by the exhaust systems as pollutants in the form of partially burned hydrocarbons, carbon-monoxide, and various other unidentifiable polluting gases.

I have found that these undesireable attributes, seemingly inherent in the conventional art of carburetion, namely the low efficiency factor and the high pollution factor, may be considerably overcome by the proposed improved method of carburetion, which will render a much greater number of burnable hydrocarbons to be made available for intermixing with the oxygen in the intake air. An arrangement of functional elements is employed in this improved method which convert liquid fuel into a gaseous vapor when said liquid fuel is discharged in the form of a spray to impinge upon a hot metal surface of an electrically heated vaporizing plate. The addition of steam vapor which is produced in similar fashion as fuel vapor above, into the mixture of fuel vapor and air will enhance the efficiency factor considerably in that the steam vapor will moderate the violence of the explosive force of the fuel vapor/air mixture, but at the same time prolong the effective power exertion upon the piston of the motor. When the resultant mixture of fuel vapor/air/steam vapor is drawn through the electrically heated environs of the porous screen in the atomizer assembly, the end product is a thoroughly mixed and atomized fuel charge in which the maximum number of fuel molecules are exposed to intermix with the greatest available quantity of oxygen for a more complete combustion.

In the accompanying drawing wherein is illustrated a preferred embodiment of my invention:

FIG. 1 is a schematic cross-sectional elevation which clearly exposes all of the components comprising the functional unit. The sequence of events that transpire in the actual operation of the unit will be described in terms of reference to the particular character with close association to the function involved therewith.

In the illustration: Liquid fuel is pumped by a conventional fuel pump (not shown) through fuel line section 1, in direction shown by arrow, thence through junction 11 and into fuel line section 2, and on into fuel delivery spray valve body 3. When valve needle 5 is lifted off its seat at spray discharge opening 4 by means of the train of linkages 6, 7, and 8, and against tension of spring 9, liquid fuel will be caused to issue under pressure from discharge opening 4 in a form of a diffused spray, which being impinged upon the heated surface of vaporizing plate 10, will instantaneously be converted into a gaseous vapor. In similar fashion as heretofore described above, water is forced by appropriate pumping means (not shown) through water line 18 in direction shown by arrow, and into water delivery spray valve body 19. When valve needle 13 is lifted off its seat at spray discharge opening 12 by means of the train of linkages 15, 16, and 17, against tension of spring 14, water will be caused to issue under pressure from opening 12 in a form of a diffused spray, which being impinged upon the heated surface of vaporizing plate 10, will instantaneously be converted to steam vapor. The resulting mixture of fuel vapor/steam vapor produced by the vaporizing plate 10 is then aspirated by the flow of intake air as it rushes through the air filter 20, down airway 21, deflected outwardly by the dome shaped deflector 22, picking up the fuel vapor/steam vapor mixture below the outer periphery of said deflector 22, and continuing down the outer circumferential circular passage 23 of the cylindrically shaped casing 24. At this point the fuel vapor/steam vapor mixture has become a fuel vapor/steam vapor/air mixture in a crude consistency, but after being drawn through the porous screen of the atomizer assembly 25, the end product becomes a thoroughly mixed potent combustible charge. Butterfly valve 26 being actuated by control arm 27 is a restricting or throttling device situated in airway 21 and determining the amount of the prepared combustible mixture that will be fed to the combustion chamber. By providing individually adjustable inter-related connections on butterfly valve control arm 27, on water delivery control arm 17, and on fuel delivery control arm 8, and connecting these to a master control arm (not shown) it will be possible to regulate and select a combustible mixture with an ideal ratio of fuel vapor to steam vapor to air that will produce an optimal degree in motor performance and fuel carburetion efficiency. For initial starting of the motor I have provided a variable pressure chamber 33 that will receive compressed air from a provided source (not shown) through air line 31 and control valve 32. It will be seen that during normal operation of the motor, the automotive fuel pump (not shown) that normally supplies liquid fuel to the liquid fuel delivery spray valve 3 also forces a certain amount of liquid fuel into variable pressure chamber 33 through bypass junction 11. Should there happen to be at any time a less than adequate pressure to supply liquid fuel to delivery spray valve 3, then the operator may restore pressure in chamber 33 manually by opening control valve 32, thereby also restoring normal flow of liquid fuel to spray valve 3. Other reference characters shown in drawing but not mentioned in the text are:

28 is a flanged joint connection;
29 is the air intake port;
30 is the air intake manifold;
34 is the pressure gauge;
35 a, b, c, and d are electric current carrying conductors.

The embodiments of the invention in which an exclusive property or privelege is claimed are defined as follows:

1. A fuel vaporizing device for converting liquid fuel from its liquid state into an atomized consistency of gaseous fuel vapor, said gaseous fuel vapor being for use in an internal combustion engine having an intake manifold, comprising: a heated liquid fuel vaporizing metal plate; a liquid fuel delivery control spray valve, said spray valve having spraying means incorporated therein in its lower extremity by a conventional needle valve, said needle valve having a spring loaded endwise slideable needle, said needle having its lower end tapered, said taper providing means to normally open or close a taper shaped aperture, said aperture being the discharge outlet of the said needle valve, the upper end of said needle having connectable means whereby linkages may be attached providing means for control of operation of said needle valve, said spraying means of said spray valve being positioned in optimally close proximity to the upper surface of said heated fuel vaporizing metal plate providing a diffused liquid fuel spray to issue therefrom under pressure, said liquid fuel spray being directed to impinge upon said upper surface of said heated fuel vaporizing metal plate thereby instantaneously converting said liquid fuel spray into gaseous fuel vapor, said pressure being provided by functioning action of conventionally equipped automotive fuel pump; a water delivery control spray valve, said water spray valve having spraying means incorporated therein in its lower extremity in similar fashion as is the physical design and structure of the liquid fuel delivery control spray valve described above, the only difference between the said water delivery control spray valve and the said liquid fuel delivery control spray valve being in the type of liquid each spray valve is intended to deliver in spray form to the designated destination said destination being the upper surface of said heated liquid fuel vaporizing metal plate, said water delivery control spray valve functioning to deliver water under pressure in said diffused spray form said spray directed to impinge upon said upper surface of said heated fuel vaporizing metal plate thereby instantaneously converting said diffused water spray into steam, said pressure being provided by the function of a suitable auxilliary water pump, an intake air deflector situated immediately above said fuel vaporizing metal plate in the pathway of intake air; and a heated 'fuel vapor/steam/air' mixture atomizing screen, said screen being situated in down stream sequence below the said heated fuel vaporizing metal plate.

2. A fuel vaporizing device according to claim 1 in which the said fuel vaporizing metal plate is electrically heated, and the said 'fuel vapor/steam/air' mixture atomizing screen is electrically heated.

3. A fuel vaporizing device according to claim 1 wherein said intake air deflector provides means for deterring the said intake air from directly striking the vaporizing surface of said heated fuel vaporizing metal plate said direct striking by said intake air against the said vaporizing surface of said heated fuel vaporizing metal plate having an undesireable cooling effect upon the said heated fuel vaporizing metal plate.

4. A fuel vaporizing device to transform liquid fuel into an atomized consistency of gaseous vapor, comprising an electrically heated liquid fuel vaporizing metal plate; a liquid fuel delivery control spray valve; a water delivery control spray valve; an intake air deflector; and an electrically heated vapor atomizing screen; said intake air deflector being a cone shaped air deflector situated immediately above the vaporizing metal plate and in the pathway of intake air and provided with appropriate apertures to admit the insertion of the spraying ends of the liquid fuel and water delivery control spray valves.

5. A fuel vaporizing device for transforming liquid fuel into an atomized gaseous vapor, comprising an electrically heated liquid fuel vaporizing metal plate; a liquid fuel delivery control spray valve to deliver a controlled spray of fuel onto said plate to produce a gaseous fuel vapour; a water delivery control spray valve for causing a controlled spray of water to impinge on said plate to be converted into steam to mix with said gaseous fuel vapor; an intake air deflector for permitting air to mix with said steam and gaseous fuel vapor; and an electrically heated vapor atomizing screen in the path of the mixture of air, steam and gaseous vapor.

6. A fuel vaporizing device according to claim 5 wherein said intake air deflector is an intake air deflecting dome.

7. A device according to claim 5 wherein said dome is a cone-shaped circular dome of substantial thickness and of such a diameter as to slightly overlap the circumferential outside edge of said vaporizing plate, said cone shaped circular dome being positioned with its apex directed, in use upwardly into a direct line of the intake air current immediately above said vaporizing plate, said cone shaped circular dome having two apertures through its slanting surface located diametrically opposite each other, the lower ends of the liquid fuel delivery control valve and the water delivery control valve being inserted each through a respective aperture.

8. A device according to claim 6 wherein said dome is a cone-shaped circular dome of substantial thickness and of such a diameter as to slightly overlap the circumferential outside edge of said vaporizing plate, said cone shaped circular dome being positioned with its apex directed, in use upwardly into a direct line of the intake air current immediately above said vaporizing plate, said cone shaped circular dome having two apertures through its slanting surface located diametrically opposite each other, the lower ends of the liquid fuel delivery control valve and the water delivery control valve being inserted each through a respective aperature.

9. A method of transforming liquid fuel into an atomised vapor, comprising the steps of heating the liquid fuel with an electrically heated liquid fuel vaporizing metal plate and utilising a liquid fuel delivery control spray valve to deliver a controlled spray of fuel onto said plate to produce a gaseous fuel vapor, causing a controlled spray of water from a water delivery control spray valve to impinge on the plate and to be converted into steam, mixing said steam with said gaseous fuel vapor; deflecting air to mix with said steam and said gaseous fuel vapor; and subjecting the mixture of air, steam and gaseous vapor to an electrically heated vapor atomizing screen in the path of said mixture.

* * * * *